(12) United States Patent
Eckman

(10) Patent No.: US 8,377,291 B2
(45) Date of Patent: Feb. 19, 2013

(54) GRAYWATER SYSTEMS

(75) Inventor: Noadiah S. Eckman, San Rafael, CA (US)

(73) Assignee: Eckman Environmental Corporation, Berkeley, CA (US)

( * ) Notice: Subject to any disclaimer, the term of this patent is extended or adjusted under 35 U.S.C. 154(b) by 0 days.

(21) Appl. No.: 13/277,215

(22) Filed: Oct. 20, 2011

(65) Prior Publication Data

US 2012/0037234 A1 Feb. 16, 2012

Related U.S. Application Data

(63) Continuation of application No. PCT/US2010/031964, filed on Apr. 21, 2010.

(60) Provisional application No. 61/323,840, filed on Apr. 13, 2010, provisional application No. 61/321,839, filed on Apr. 7, 2010, provisional application No. 61/171,977, filed on Apr. 23, 2009.

(51) Int. Cl.
*C02F 1/00* (2006.01)
*C02F 1/32* (2006.01)
*B01D 35/027* (2006.01)

(52) U.S. Cl. ......... 210/86; 210/105; 210/108; 210/121; 210/123; 210/127; 210/136; 210/170.08; 210/172.1; 210/192; 210/409; 210/411; 210/413; 210/416.1; 210/420; 210/748.1

(58) Field of Classification Search .................. None
See application file for complete search history.

(56) References Cited

U.S. PATENT DOCUMENTS

| | | | |
|---|---|---|---|
| 649,838 A * | 5/1900 | Harry | 137/122 |
| 726,063 A * | 4/1903 | Hummel | 137/120 |
| 914,936 A * | 3/1909 | Estes | 137/122 |
| 1,127,500 A * | 2/1915 | Overmiller | 137/122 |
| 1,460,613 A * | 7/1923 | Sill | 137/373 |
| 1,490,431 A * | 4/1924 | Pendergraft | 137/122 |
| 2,292,764 A * | 8/1942 | Levering | 137/122 |
| 2,463,814 A * | 3/1949 | Skinner | 210/354 |
| 2,858,939 A * | 11/1958 | Corliss | 210/136 |
| 2,974,800 A * | 3/1961 | Fleischmann | 210/114 |
| 3,318,449 A * | 5/1967 | Jennings et al. | 210/104 |
| 3,341,016 A * | 9/1967 | Paasche | 210/801 |
| 3,440,669 A * | 4/1969 | Boester | 4/317 |
| 3,502,215 A * | 3/1970 | Cahan | 210/167.31 |
| 3,515,278 A * | 6/1970 | Wilson | 210/109 |
| 3,543,294 A * | 11/1970 | Boester | 210/620 |
| 3,550,778 A * | 12/1970 | Kesselman | 210/167.3 |
| 3,616,917 A * | 11/1971 | Hellwege | 210/167.31 |
| 3,645,400 A * | 2/1972 | Floyd | 210/108 |
| 3,673,614 A * | 7/1972 | Claunch | 4/314 |
| 3,717,251 A * | 2/1973 | Hampton | 210/741 |
| 3,774,625 A * | 11/1973 | Wiltrout | 134/104.2 |
| 3,815,159 A * | 6/1974 | Delaney et al. | 4/317 |
| 3,835,478 A * | 9/1974 | Molus | 4/314 |
| 3,911,938 A * | 10/1975 | Wiltrout | 134/104.1 |
| 3,915,857 A * | 10/1975 | Olson | 210/668 |
| 3,922,730 A * | 12/1975 | Kemper | 4/316 |
| 3,927,425 A * | 12/1975 | Delaney et al. | 4/317 |
| 3,950,249 A * | 4/1976 | Eger et al. | 210/104 |
| 3,974,528 A * | 8/1976 | Claunch et al. | 210/167.3 |
| 3,995,327 A * | 12/1976 | Hendrick | 4/363 |
| 3,995,328 A * | 12/1976 | Carolan et al. | 4/316 |
| 4,011,162 A * | 3/1977 | Oldham et al. | 210/121 |
| 4,017,395 A * | 4/1977 | Davis | 210/167.3 |

(Continued)

*Primary Examiner* — Robert James Popovics
(74) *Attorney, Agent, or Firm* — Eckman Basu LLP

(57) ABSTRACT

A water recycling system that can be used for reclaiming and recycling water, waste water, or grey water, for providing landscape irrigation, or for recycling uses such as for sanitary facilities, as well as for pre-heating clean water to save energy. A water recycling system may include a sealable tank, an influx pipe, a self-clearing filter disposed within the tank, a pump, and an effluent pipe.

10 Claims, 2 Drawing Sheets

U.S. PATENT DOCUMENTS

| | | | |
|---|---|---|---|
| 4,052,975 A * | 10/1977 | Ceideburg | 126/572 |
| 4,104,164 A * | 8/1978 | Chelton | 210/136 |
| 4,112,972 A * | 9/1978 | Lajeuness | 137/597 |
| 4,115,879 A * | 9/1978 | Toms | 4/318 |
| 4,134,833 A * | 1/1979 | McCormick | 210/121 |
| 4,145,279 A * | 3/1979 | Selby, III | 210/614 |
| 4,162,218 A * | 7/1979 | McCormick | 210/104 |
| 4,196,082 A * | 4/1980 | Salokangas et al. | 210/180 |
| 4,197,597 A * | 4/1980 | Toms | 4/300 |
| 4,210,528 A * | 7/1980 | Coviello et al. | 210/605 |
| 4,211,652 A * | 7/1980 | Thomas | 210/703 |
| 4,228,006 A * | 10/1980 | Hanna | 210/167.3 |
| 4,349,436 A * | 9/1982 | Kaump | 210/104 |
| 4,359,789 A * | 11/1982 | Roberts | 4/300 |
| 4,371,441 A * | 2/1983 | Mathes et al. | 210/649 |
| 4,415,462 A * | 11/1983 | Finch et al. | 210/767 |
| 4,439,317 A * | 3/1984 | Jarrell | 210/151 |
| 4,465,594 A * | 8/1984 | Laak | 210/151 |
| 4,501,665 A * | 2/1985 | Wilhelmson | 210/630 |
| 4,652,368 A * | 3/1987 | Ennis et al. | 210/97 |
| 4,812,237 A * | 3/1989 | Cawley et al. | 210/605 |
| 4,871,452 A * | 10/1989 | Kohler et al. | 210/167.3 |
| 4,897,202 A * | 1/1990 | King | 210/754 |
| 4,897,203 A * | 1/1990 | King | 210/754 |
| 4,924,536 A * | 5/1990 | Houghton | 4/665 |
| 4,934,404 A * | 6/1990 | DeStefano | 137/357 |
| 5,004,536 A * | 4/1991 | Geisler | 210/136 |
| 5,006,232 A * | 4/1991 | Lidgitt et al. | 210/96.1 |
| 5,011,598 A * | 4/1991 | Nathanson | 210/136 |
| 5,035,011 A * | 7/1991 | Rozenblatt et al. | 4/665 |
| 5,039,407 A * | 8/1991 | Mohrman | 210/195.1 |
| 5,059,330 A * | 10/1991 | Burkhardt | 210/744 |
| 5,084,920 A * | 2/1992 | Kimball | 4/665 |
| 5,099,874 A * | 3/1992 | Della Cave | 137/357 |
| 5,100,540 A * | 3/1992 | Ramirez et al. | 210/86 |
| 5,106,493 A * | 4/1992 | McIntosh | 210/100 |
| 5,114,586 A * | 5/1992 | Humphrey | 210/606 |
| 5,147,532 A * | 9/1992 | Leek, Jr. | 210/97 |
| 5,160,606 A * | 11/1992 | De Simone et al. | 210/110 |
| 5,171,434 A * | 12/1992 | Anderson et al. | 210/121 |
| 5,173,180 A * | 12/1992 | Stewart et al. | 210/167.01 |
| 5,192,426 A * | 3/1993 | DeCoster et al. | 210/117 |
| 5,201,082 A * | 4/1993 | Rockwell | 4/665 |
| 5,217,323 A * | 6/1993 | Bilson | 405/43 |
| 5,243,719 A * | 9/1993 | McDonald et al. | 4/665 |
| 5,251,346 A * | 10/1993 | Donati | 4/665 |
| 5,254,246 A * | 10/1993 | Rivelli et al. | 210/195.4 |
| 5,274,861 A * | 1/1994 | Ford | 4/665 |
| 5,288,412 A * | 2/1994 | Voorhees et al. | 210/739 |
| 5,317,766 A * | 6/1994 | McDonald et al. | 4/665 |
| 5,341,529 A * | 8/1994 | Serrano | 4/665 |
| 5,345,625 A * | 9/1994 | Diemand | 4/665 |
| 5,372,710 A * | 12/1994 | Frank | 210/117 |
| 5,374,352 A * | 12/1994 | Pattee | 210/104 |
| 5,403,498 A * | 4/1995 | Morrissey et al. | 210/767 |
| 5,406,966 A * | 4/1995 | Lepkowski et al. | 134/104.4 |
| 5,407,562 A * | 4/1995 | Baldino | 210/86 |
| 5,409,616 A * | 4/1995 | Garbutt et al. | 210/760 |
| 5,452,956 A * | 9/1995 | Gilliam | 366/348 |
| 5,454,936 A * | 10/1995 | Ask et al. | 210/86 |
| 5,465,434 A * | 11/1995 | Coe | 4/546 |
| 5,498,330 A * | 3/1996 | Delle Cave | 210/103 |
| 5,501,792 A * | 3/1996 | Carroll, Jr. | 210/141 |
| 5,526,612 A * | 6/1996 | Wade | 52/12 |
| 5,557,812 A * | 9/1996 | Sayant | 4/665 |
| 5,573,677 A * | 11/1996 | Dembrosky | 210/764 |
| 5,575,908 A * | 11/1996 | Mondragon, Jr. | 210/257.1 |
| 5,609,754 A * | 3/1997 | Stuth | 210/151 |
| 5,620,594 A * | 4/1997 | Smith et al. | 210/167.3 |
| 5,728,305 A * | 3/1998 | Hawkinson | 210/760 |
| 5,730,179 A * | 3/1998 | Taylor | 137/357 |
| 5,738,781 A * | 4/1998 | Carlson | 210/170.08 |
| 5,759,387 A * | 6/1998 | Wilkes | 210/139 |
| 5,787,537 A * | 8/1998 | Mannillo | 8/158 |
| 5,813,047 A * | 9/1998 | Teichroeb | 4/665 |
| 5,836,116 A * | 11/1998 | Widmann | 52/169.7 |
| 5,845,346 A * | 12/1998 | Johnson, Jr. | 4/665 |
| 5,863,151 A * | 1/1999 | Chapotelle | 405/52 |
| 5,868,937 A * | 2/1999 | Back et al. | 210/651 |
| 5,908,550 A * | 6/1999 | Kaipainen | 210/167.3 |
| 5,958,240 A * | 9/1999 | Hoel | 210/608 |
| 6,080,307 A * | 6/2000 | Morris et al. | 210/163 |
| 6,106,706 A * | 8/2000 | Roy et al. | 210/99 |
| 6,132,138 A * | 10/2000 | Haese | 405/37 |
| 6,139,729 A * | 10/2000 | Gonzalez, Jr. | 210/164 |
| 6,177,004 B1 * | 1/2001 | Bracone, Jr. | 210/86 |
| 6,206,612 B1 * | 3/2001 | Meyer | 405/36 |
| 6,238,563 B1 * | 5/2001 | Carroll et al. | 210/605 |
| 6,269,667 B1 * | 8/2001 | Back et al. | 68/17 R |
| 6,282,733 B1 * | 9/2001 | Gonzalez, Jr. | 4/665 |
| 6,299,775 B1 * | 10/2001 | Elston | 210/605 |
| 6,299,779 B1 * | 10/2001 | Pattee | 210/694 |
| 6,315,897 B1 * | 11/2001 | Maxwell | 210/170.03 |
| 6,327,731 B1 * | 12/2001 | Back et al. | 8/158 |
| 6,328,882 B1 * | 12/2001 | Rosenblatt | 210/104 |
| 6,328,901 B1 * | 12/2001 | Batten | 210/774 |
| 6,355,160 B1 * | 3/2002 | Wiseman et al. | 210/90 |
| 6,361,695 B1 * | 3/2002 | Husain et al. | 210/614 |
| 6,379,546 B1 * | 4/2002 | Braun | 210/607 |
| 6,383,369 B2 * | 5/2002 | Elston | 210/86 |
| 6,393,775 B1 * | 5/2002 | Staschik | 52/79.1 |
| 6,402,945 B1 * | 6/2002 | Swales et al. | 210/195.1 |
| 6,418,580 B1 * | 7/2002 | Teran et al. | 8/158 |
| 6,474,111 B1 * | 11/2002 | Pattee | 68/18 F |
| 6,497,816 B2 * | 12/2002 | Naddy | 210/162 |
| 6,519,787 B2 * | 2/2003 | Kim | 4/318 |
| 6,523,186 B2 * | 2/2003 | Kim | 4/318 |
| 6,526,699 B2 * | 3/2003 | Foglio, Sr. | 52/15 |
| 6,547,488 B2 * | 4/2003 | Imbrigiotta | 405/36 |
| 6,561,387 B1 * | 5/2003 | Slawson | 222/181.1 |
| 6,607,671 B2 * | 8/2003 | Vuong | 210/723 |
| 6,619,312 B2 * | 9/2003 | Doiron | 137/122 |
| 6,645,387 B2 * | 11/2003 | Naski et al. | 210/744 |
| 6,647,670 B1 * | 11/2003 | Dran | 52/16 |
| 6,655,304 B1 * | 12/2003 | Barlow | 110/347 |
| 6,673,251 B2 * | 1/2004 | Swales et al. | 210/760 |
| 6,702,942 B1 * | 3/2004 | Nield | 210/416.1 |
| 6,746,612 B2 * | 6/2004 | Hammond | 210/744 |
| 6,749,743 B1 * | 6/2004 | Rohrer et al. | 210/97 |
| 6,818,127 B1 * | 11/2004 | Ketrow | 210/170.03 |
| 6,838,000 B2 * | 1/2005 | Braun | 210/603 |
| 6,849,176 B1 * | 2/2005 | Batten et al. | 210/97 |
| 6,868,971 B2 * | 3/2005 | Phillips | 209/17 |
| 6,887,375 B2 * | 5/2005 | Johnson | 210/170.03 |
| 6,889,395 B1 * | 5/2005 | Hodges | 4/665 |
| 6,896,818 B2 * | 5/2005 | Perry et al. | 210/744 |
| 6,904,926 B2 * | 6/2005 | Aylward et al. | 137/119.01 |
| 6,941,702 B1 * | 9/2005 | Abrams et al. | 52/16 |
| 6,953,529 B2 * | 10/2005 | Weir | 210/791 |
| 6,966,333 B1 * | 11/2005 | Kuehneman | 137/357 |
| 6,969,460 B2 * | 11/2005 | Bertram | 210/130 |
| 6,988,640 B2 * | 1/2006 | Backe | 222/109 |
| 7,108,782 B1 * | 9/2006 | Higgins et al. | 210/151 |
| 7,118,677 B2 * | 10/2006 | Hoffjann et al. | 210/744 |
| 7,121,292 B2 * | 10/2006 | Aylward et al. | 137/2 |
| 7,153,439 B1 * | 12/2006 | Batten et al. | 210/800 |
| 7,207,748 B1 * | 4/2007 | Urban | 405/51 |
| 7,211,187 B2 * | 5/2007 | Lumbert | 210/153 |
| 7,252,766 B2 * | 8/2007 | Stuth et al. | 210/605 |
| 7,258,785 B2 * | 8/2007 | Weir et al. | 210/163 |
| 7,267,235 B2 * | 9/2007 | Sharir | 210/413 |
| 7,300,590 B2 * | 11/2007 | Weir et al. | 210/747.3 |
| 7,309,419 B2 * | 12/2007 | Rhorer et al. | 210/119 |
| 7,371,323 B1 * | 5/2008 | Spielman et al. | 210/605 |
| 7,374,669 B2 * | 5/2008 | Zinn | 210/138 |
| 7,395,633 B2 * | 7/2008 | Baeta | 52/16 |
| D575,853 S * | 8/2008 | Adamson | D23/267 |
| 7,413,650 B2 * | 8/2008 | Lumbert | 210/153 |
| 7,449,107 B2 * | 11/2008 | Lumbert | 210/153 |
| 7,465,391 B2 * | 12/2008 | Heist et al. | 210/162 |
| 7,493,728 B2 * | 2/2009 | Dussault et al. | 52/16 |
| 7,534,070 B1 * | 5/2009 | Urban | 405/51 |
| 7,534,357 B2 * | 5/2009 | Markle et al. | 210/760 |
| 7,550,077 B2 * | 6/2009 | Graf | 210/162 |
| 7,575,047 B2 * | 8/2009 | Lackinger et al. | 165/247 |
| 7,597,116 B2 * | 10/2009 | Detwiler | 137/899.2 |
| 7,611,624 B2 * | 11/2009 | Perry et al. | 210/121 |

| Patent/Publication | Date | Inventor | Class |
|---|---|---|---|
| 7,713,427 B2 * | 5/2010 | Perry et al. | 210/777 |
| D618,316 S * | 6/2010 | Lobban | D23/267 |
| 7,775,232 B2 * | 8/2010 | Takai | 137/122 |
| 7,779,855 B2 * | 8/2010 | McAvoy et al. | 137/120 |
| RE41,761 E * | 9/2010 | Wiseman et al. | 210/90 |
| 7,854,852 B1 * | 12/2010 | Reavis | 210/767 |
| 7,870,868 B1 * | 1/2011 | Ilalaole | 137/434 |
| 7,919,002 B1 * | 4/2011 | Hurtado | 210/747.2 |
| 7,947,164 B2 * | 5/2011 | Hoffjann et al. | 205/742 |
| 8,033,058 B2 * | 10/2011 | Block | 52/12 |
| 8,074,933 B2 * | 12/2011 | Mackulin et al. | 244/136 |
| 8,075,765 B2 * | 12/2011 | Perlatti | 210/162 |
| 8,097,151 B2 * | 1/2012 | Allan | 210/162 |
| 8,110,097 B2 * | 2/2012 | Arai | 210/167.1 |
| 8,114,663 B1 * | 2/2012 | Henley et al. | 435/289.1 |
| 8,133,385 B2 * | 3/2012 | Premathilake et al. | 210/85 |
| 8,191,307 B2 * | 6/2012 | Donoghue et al. | 47/48.5 |
| 8,221,029 B2 * | 7/2012 | Henry et al. | 405/36 |
| 8,240,950 B1 * | 8/2012 | Everson | 405/51 |
| 8,246,829 B2 * | 8/2012 | O'Regan, Jr. | 210/605 |
| 2001/0027580 A1 * | 10/2001 | Back et al. | 8/158 |
| 2002/0008065 A1 * | 1/2002 | Elston | 210/605 |
| 2002/0175128 A1 * | 11/2002 | Swales et al. | 210/760 |
| 2003/0034310 A1 * | 2/2003 | Vuong | 210/724 |
| 2003/0070986 A1 * | 4/2003 | Braun | 210/620 |
| 2003/0106854 A1 * | 6/2003 | Robinson | 210/748 |
| 2003/0141257 A1 * | 7/2003 | Hammond | 210/744 |
| 2004/0035768 A1 * | 2/2004 | Bertram | 210/112 |
| 2004/0045910 A1 * | 3/2004 | Hoffjann et al. | 210/758 |
| 2004/0050429 A1 * | 3/2004 | Aylward et al. | 137/597 |
| 2004/0144704 A1 * | 7/2004 | Johnson | 210/170 |
| 2004/0168992 A1 * | 9/2004 | Ben-Amotz | 210/805 |
| 2004/0226869 A1 * | 11/2004 | McClure et al. | 210/163 |
| 2005/0045565 A1 * | 3/2005 | Perry et al. | 210/774 |
| 2005/0056581 A1 * | 3/2005 | Arguello | 210/258 |
| 2005/0061738 A1 * | 3/2005 | Holt | 210/605 |
| 2005/0072467 A1 * | 4/2005 | Aylward et al. | 137/119.01 |
| 2005/0205479 A1 * | 9/2005 | Sharir | 210/121 |
| 2006/0091083 A1 * | 5/2006 | Lumbert | 210/760 |
| 2006/0144769 A1 * | 7/2006 | Okros | 210/123 |
| 2006/0237373 A1 * | 10/2006 | Zinn | 210/741 |
| 2006/0254965 A1 * | 11/2006 | Turley | 210/195.1 |
| 2007/0062867 A1 * | 3/2007 | Perry et al. | 210/607 |
| 2007/0068879 A1 * | 3/2007 | Markle et al. | 210/760 |
| 2007/0090030 A1 * | 4/2007 | Teran et al. | 210/86 |
| 2007/0102370 A1 * | 5/2007 | Hoffjann et al. | 210/748 |
| 2007/0187338 A1 * | 8/2007 | Lumbert | 210/748 |
| 2007/0215551 A1 * | 9/2007 | Braun | 210/664 |
| 2007/0235097 A1 * | 10/2007 | Detwiler | 137/899.2 |
| 2008/0023412 A1 * | 1/2008 | Holt | 210/760 |
| 2008/0086953 A1 * | 4/2008 | Graf | 52/12 |
| 2008/0173581 A1 * | 7/2008 | Maclean | 210/620 |
| 2008/0175668 A1 * | 7/2008 | Haese | 405/36 |
| 2008/0190868 A1 * | 8/2008 | Perry et al. | 210/769 |
| 2008/0257753 A1 * | 10/2008 | Burton | 205/742 |
| 2009/0065072 A1 * | 3/2009 | Adamson | 137/357 |
| 2009/0166296 A1 * | 7/2009 | Tigani et al. | 210/716 |
| 2009/0188867 A1 * | 7/2009 | Vuong et al. | 210/652 |
| 2009/0212161 A1 * | 8/2009 | MacKulin et al. | 244/129.1 |
| 2009/0218280 A1 * | 9/2009 | Josse | 210/605 |
| 2009/0218282 A1 * | 9/2009 | Markle et al. | 210/638 |
| 2009/0223882 A1 * | 9/2009 | Markle et al. | 210/150 |
| 2009/0255860 A1 * | 10/2009 | McLeod | 210/130 |
| 2009/0255863 A1 * | 10/2009 | Theodore et al. | 210/170.01 |
| 2009/0255876 A1 * | 10/2009 | Dunbar | 210/709 |
| 2009/0266770 A1 * | 10/2009 | Jamse et al. | 210/744 |
| 2009/0272447 A1 * | 11/2009 | Dvorak | 137/861 |
| 2009/0297271 A1 * | 12/2009 | Hummert et al. | 405/51 |
| 2010/0038300 A1 * | 2/2010 | Allan | 210/248 |
| 2010/0043129 A1 * | 2/2010 | Platteel et al. | 4/300 |
| 2010/0096390 A1 * | 4/2010 | Allan | 220/565 |
| 2010/0122738 A1 * | 5/2010 | Williamson | 137/356 |
| 2010/0122739 A1 * | 5/2010 | Williamson | 137/395 |
| 2010/0122740 A1 * | 5/2010 | Williamson | 137/395 |
| 2010/0122741 A1 * | 5/2010 | Williamson | 137/395 |
| 2010/0122944 A1 * | 5/2010 | Williamson | 210/88 |
| 2010/0122945 A1 * | 5/2010 | Williamson | 210/92 |
| 2010/0126233 A1 * | 5/2010 | Okros | 68/12.13 |
| 2010/0155328 A1 * | 6/2010 | O'Regan, Jr. | 210/614 |
| 2010/0200484 A1 * | 8/2010 | Premathilake et al. | 210/177 |
| 2010/0300951 A1 * | 12/2010 | Vierling et al. | 210/232 |
| 2010/0307984 A1 * | 12/2010 | Mortensen et al. | 210/704 |
| 2011/0024338 A1 * | 2/2011 | Milani | 210/96.1 |
| 2011/0036410 A1 * | 2/2011 | Tontegode | 137/1 |
| 2011/0036760 A1 * | 2/2011 | Retolaza Gavina et al. | 210/85 |
| 2011/0052320 A1 * | 3/2011 | Haese | 405/36 |
| 2011/0068060 A1 * | 3/2011 | Hatten | 210/739 |
| 2011/0132817 A1 * | 6/2011 | Gardner et al. | 210/90 |
| 2011/0147282 A1 * | 6/2011 | Hellenbrand et al. | 210/85 |
| 2011/0155366 A1 * | 6/2011 | Brunn | 165/287 |
| 2011/0163021 A1 * | 7/2011 | Ehlert | 210/137 |
| 2011/0186489 A1 * | 8/2011 | Kain et al. | 210/151 |
| 2011/0210049 A1 * | 9/2011 | O'regan, Jr. | 210/85 |
| 2011/0226341 A1 * | 9/2011 | Platteel et al. | 137/1 |
| 2011/0253604 A1 * | 10/2011 | Mercer et al. | 210/85 |
| 2011/0303589 A1 * | 12/2011 | Kuennen et al. | 210/95 |
| 2012/0037234 A1 * | 2/2012 | Eckman | 137/1 |
| 2012/0060932 A1 * | 3/2012 | Gutierrez-Wolf et al. | 137/2 |
| 2012/0090707 A1 * | 4/2012 | Marugame | 137/565.01 |
| 2012/0091050 A1 * | 4/2012 | Parkinson et al. | 210/196 |
| 2012/0168385 A1 * | 7/2012 | Anderson | 210/703 |
| 2012/0181235 A1 * | 7/2012 | Leonard | 210/747.2 |
| 2012/0199220 A1 * | 8/2012 | Knepp et al. | 137/558 |
| 2012/0228117 A1 * | 9/2012 | Panunzio | 203/10 |

* cited by examiner

GRAYWATER SYSTEMS

CROSS REFERENCE TO RELATED APPLICATIONS

This application is a continuation of prior PCT International Application No. PCT/US2010/031964, filed Apr. 21, 2010, which claims the benefit of U.S. Provisional Application Nos. 61/323,840, filed Apr. 13, 2010, 61/321,839, filed Apr. 7, 2010, and 61/171,977, filed Apr. 23, 2009, each of which is hereby incorporated by reference in its entirety.

BACKGROUND

As the Green Revolution progresses and enters new battlegrounds for change, water conservation and efficient use of energy have become focal points. The demand for clean water continues to rise as human populations increase. In many areas, demand for clean water is expected to exceed supply, creating a need for increased infrastructure and expense of energy to meet the ever-increasing demand. Further, human activity continues to encroach upon and threaten our precarious river delta regions and other wetlands. Thus, the rate of addition of carbon to the atmosphere continues to increase, making the efficient use of energy a higher priority.

Water shortages and drought are chronic problems in many urban and rural areas. Drought is one of the most costly natural disasters. Damages from drought can be enormous, including agricultural losses, the destruction of residential and industrial landscaping and lawns, damage to urban and suburban trees, and the increased occurrence and risk of wildfires. In some areas, drought can buckle residential building foundations and cause structural damage.

A particularly difficult problem is the waste of clean water. Reducing the waste of water that has already been transported and extensively filtered, purified and cleansed of pathogens is an important element of change in bringing a greener practice to residential settings. Moreover, the clean water that is wasted is very often heated clean water, which contributes further to the waste of energy and carbon emissions.

For example, clothes laundering can be about one-quarter of residential water use, and all of this water is typically discarded after the washing operation. Further, residential faucets and showerheads that have too high a flow rate add to the waste of clean water. In the U.S. alone, inefficient washing machines and plumbing may waste hundreds of billions of gallons of clean water per year. The loss of clean water is especially frustrating because it represents energy already expended in purification and transport.

One way to ameliorate the problem of waste is through water conservation measures such as rationing, replacing washing machines and plumbing fixtures with more efficient models, and establishing greener practices such as harvesting rainwater and using landscaping that requires less water.

Another way to save water is to recycle. It is an unfortunate feature of most building construction that the majority of effluent waste water is in the form of grey water that exits directly to the sanitary drainage system. Grey water is defined in the International Plumbing Code as waste discharged from lavatories, bathtubs, showers, clothes washers, and laundry trays, and in the Universal Plumbing Code as being household waste water from bathtubs, showers, bathroom wash basins, clothes washers, and laundry tubs that has not come into contact with toilet waste, but not water from kitchen sinks or dishwashers.

Because about one-third of all water use is for outdoor watering, the use of grey water for this purpose would be a step in the right direction to advance our transformation to a greener environment.

The widespread installation of grey water recycling devices for both residential and industrial use has been limited in part because of the high capital cost for installation. Moreover, water recycling systems can require significant attention for regular maintenance and service.

WO/2007/040394 relates to a device for reusing greywater and a method of siphoning water from a collecting reservoir to a storage tank.

WO/2006/005118 relates to a modular water treatment apparatus having cells arranged in a treatment bed.

US 2005/0205479 relates to a greywater recycling apparatus having a filter that when clogged is manually cleaned by brushing, reconnecting for reverse flow, or by removal.

WO/2004/057119 relates to a greywater recycling system consisting of one or more tanks which is operating automatically and recycles greywater from a washing machine and uses greywater accumulating only within the same household.

Significant problems with recycling of greywater include emergency overflow conditions, backflow of greywater, clogging of the filter used in the greywater recycling system, and storing within the tank of the recycling system the solid waste that is removed from the greywater.

There is a significant need for systems and methods for water recycling, especially automated systems having reduced maintenance and servicing costs, to reclaim and efficiently reuse residential and other waste water. For example, a conventional filter typically requires that either the filter be replaced or serviced frequently, or that the operative flow process be interrupted to clean the filter.

This invention provides devices and methods for water recycling. Among other things, this disclosure provides an apparatus for reclaiming, purifying, and recycling grey water that advantageously requires little or no maintenance and is easy to manufacture and install.

BRIEF SUMMARY

This invention relates to systems and methods for efficient water recycling and energy conservation, including low-maintenance automated systems, to reclaim and efficiently reuse waste water. This invention provides systems, devices and methods for water recycling. Among other things, this disclosure provides an apparatus for reclaiming, purifying, and recycling grey water that employs a self-clearing filter.

This invention provides a range of systems, devices and methods for reclaiming water and water recycling, especially grey water recycling for residential and industrial building and outdoor uses. Among other things, this disclosure provides configurations for an apparatus for reclaiming grey water, and for purifying and using the grey water for various purposes.

In some embodiments, a water recycling system for providing a dose of a filtered water effluent, comprising a sealable tank having a wall, a water influx pipe for delivering water from a source to the tank, the influx pipe being fluidly connected at a first end to the source, wherein the influx pipe engages the wall sealingly and passes through the wall on one side of the tank and traverses to, and passes sealingly through the wall at a distal point, wherein the influx pipe is fluidly connected at a second end through a one-way valve to an external sanitary drain line, and wherein the influx pipe defines an opening disposed on its gravitationally lower side within the tank, a self-clearing filter disposed within the tank for filtering the water from the source, the self-clearing filter comprising a filter screen disposed to span the opening of the influx pipe, and further comprising a nozzle, wherein the water from the source passes through the filter screen and is stored as filtered water in the tank, a pump having an inlet in fluid communication with the filtered water and through which the filtered water can be drawn, wherein the pump supplies a filtered water effluent; and an effluent pipe fluidly connected to the pump for directing the filtered water effluent out of the tank, wherein the nozzle of the self-clearing filter is fluidly connected to the effluent pipe and provides a spray of filtered water effluent, wherein the spray contacts the self-clearing filter screen and is adapted to force waste material off the filter screen into the influx pipe.

In some embodiments, a water recycling system may include a collector disposed under the filter screen, a UV tube carrier enclosing a UV tube for irradiating the water, wherein the collector directs the water into the UV tube carrier, a pump for supplying a UV-treated water effluent, an effluent pipe fluidly connected to the pump for directing UV-treated water effluent out of the tank, wherein the nozzle of the self-clearing filter is fluidly connected to the effluent pipe for spraying the UV-treated water effluent onto the self-clearing filter screen and adapted to force solid waste material off the filter screen and into the influx pipe; and a means for controlling the dose of the UV-treated water effluent out of the tank.

The water from the source may be grey water. In some embodiments, the UV tube carrier may direct the filtered water flux in a gravitationally downward spiral path around a UV tube. The influx pipe, screen, collector and nozzle can be integrated. The means for controlling the dose of the UV-treated water effluent out of the tank may be a float switch. The pump can be manually operated to empty the tank. The water recycling system may have a one-way valve between the pump and the effluent pipe. The filter screen may be a half-pipe filter screen. The filter screen may be a wire mesh screen, a wire mesh blanket, a wire mesh tube, or a perforated screen.

The dose of the water recycling system may be less than about 200 liters, or less than about 4000 liters. The water recycling system can also have a bypass for diverting the water from the source away from the first end of the influx pipe and preventing entry of the water from the source into the tank.

This invention also encompasses a self-clearing filter system for a water recycling apparatus. A self-clearing filter may include a filter for filtering an influx source water, the filter having a screen having a lumenous side and an external side, a pump for supplying the filtered influx source water to a nozzle, wherein the nozzle is fluidly connected to the pump for receiving the filtered influx source water from the pump, and wherein under pressure from the pump the filtered influx source water exits the nozzle in a spray impinging against the external side of the filter screen to force waste material off the lumenous side of the screen to clear the filter. In some embodiments, the self-clearing filter system has a wire mesh screen, a wire mesh blanket, a wire mesh tube, or a perforated screen.

This disclosure further contemplates a kit for grey water recycling having a water recycling system, means for connecting the water influx pipe to a source of grey water, means for connecting the effluent pipe to an irrigation system, and means for connecting the one-way valve at the second end of the influx pipe to an external sanitary drain line.

This invention includes methods for recycling grey water at a residential or industrial site by providing a water recycling system at the site and connecting the system to a source of grey water. The methods include reclaiming grey water for a landscape drip irrigation system.

In some aspects, this invention includes methods for pre-heating clean water in the plumbing of a building to save energy by reclaiming grey water outside the building, returning the reclaimed grey water to the building, and contacting the returned grey water with the clean water plumbing of the building, thereby transferring heat from the returned grey water to clean water within the plumbing of the building. Some of the grey water may be reclaimed inside the building.

In some variations, this invention includes methods for recycling grey water in a laundry facility by connecting the recycling apparatus to a source of grey water from the laundry facility, and recycling the grey water from the source to a clean water line of the laundry facility.

In certain variations, this invention includes methods for recycling grey water in a car wash facility by connecting the recycling apparatus to a source of grey water from the car wash facility, and recycling the grey water from the source to a clean water line of the car wash facility.

This brief summary, taken along with the detailed description of the invention, as well as the figures, the appended examples and claims, as a whole, encompass the disclosure of the invention.

DETAILED DESCRIPTION

Figure 1:
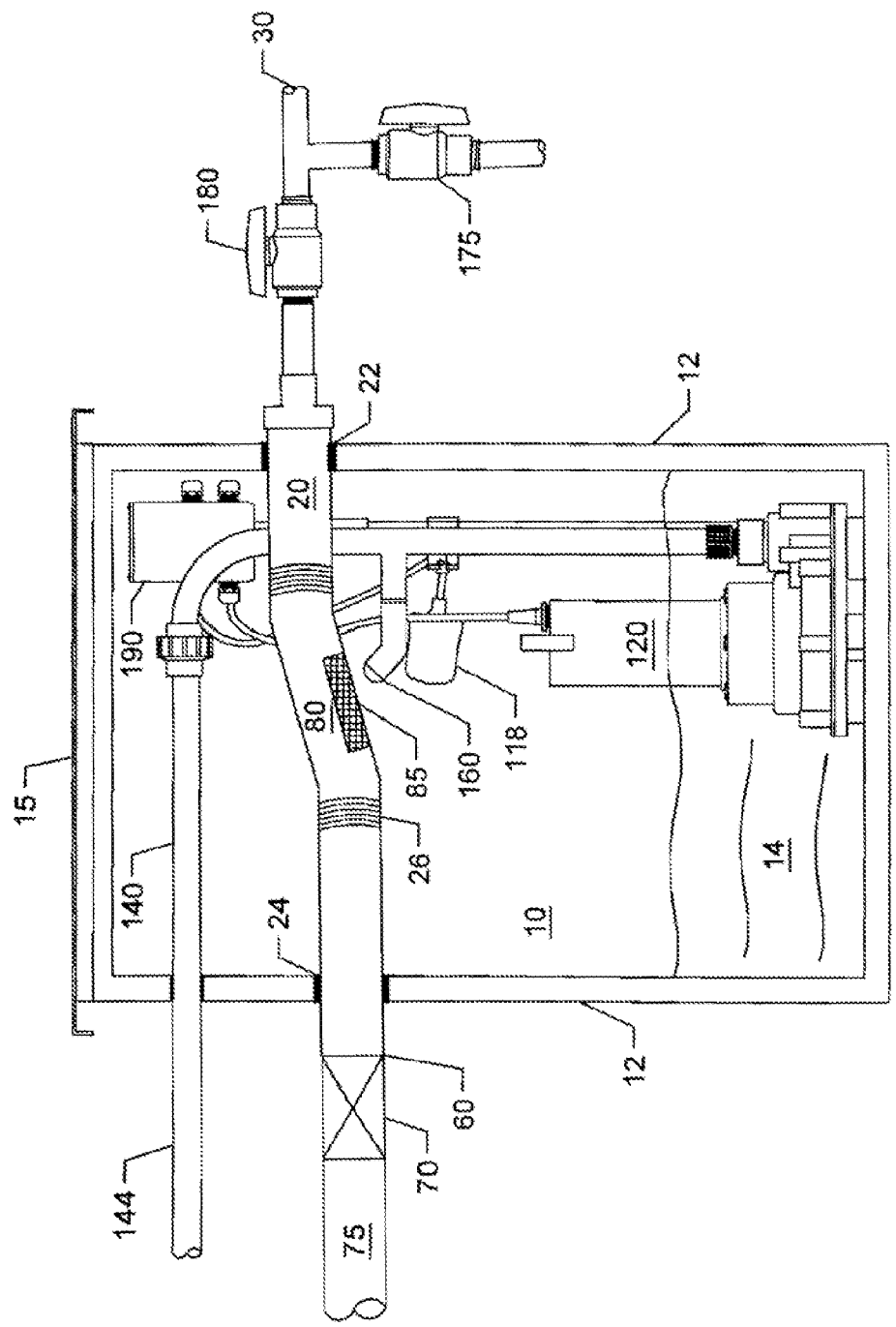
FIG. 1: Schematic representation of an embodiment of this invention in which water to be recycled is reclaimed from a source. Water enters into a sealable tank through an influx pipe, and is filtered with a self-clearing filter. The water is stored in the tank and can be dosed with a pump to an external system such as a drip irrigation system, or can be pumped to a building for recycling or energy-saving uses. Excess water or overflow can exit directly to a sanitary drain.

This invention provides systems, devices and methods for water recycling, especially grey water recycling for a variety of settings including uses for residential and industrial buildings and grounds. Among other things, this disclosure provides a range of configurations for an apparatus for reclaiming grey water which can provide filtration and purification, as well as storage and dosing of grey water. The water recycling system can be sited external to a building or at any location. The water recycling systems of this disclosure are essentially automated and advantageously require little or no scheduled maintenance. Among other things, this disclosure provides an apparatus for reclaiming, filtering and recycling grey water that employs a self-clearing filter.

A water recycling system of this invention can also be used to reclaim and recycle water from any source.

Reclaimed and treated grey water may be delivered into an outdoor system for a variety of uses including drip irrigation, subsurface irrigation, underground watering, and various surface uses. Reclaimed and treated grey water may also be dosed back into a building for recycling to internal facilities such as toilets or to pre-heat other clean water lines. Other uses include reclaiming and recycling grey water form industrial sources such as car washes and laundry facilities.

In some embodiments, the reclaimed grey water is purified, partially purified or disinfected to reduce levels of pathogens. Methods to reduce pathogens include ultraviolet irradiation of the grey water influx, biotransformation, and various chemical treatments as are known in the art.

The grey water recycling system of this invention advantageously requires little or no maintenance. The components may be provided as a kit for installation at commercial sites, or by homeowners. In some aspects, the grey water recycling system is advantageously used in non-freezing environments, and can be adapted for cooler climates.

Among other things, greywater can be used in subsurface irrigation applications ranging from shallow gravel trenches to sophisticated irrigation systems. In general, the safe use and disposal of greywater in the landscaping requires site work to determine the capacity of the soils to accept the flows from the residence or building and to prevent resurfacing of the greywater. A low-head sump pump can "dose" the irrigation bed in measured flows from the tank.

This invention provides solutions to significant problems with recycling of greywater.

In some aspects, this invention provides a way to control greywater flow by preventing an emergency overflow condition. Any excess flow of greywater that cannot find its way through the filter and into the tank to be recycled can exit directly to the sanitary drain. Thus, in essence, no emergency overflow condition is possible.

Moreover, in some embodiments, backflow of greywater can be prevented by using a one-way valve.

In further embodiments, clogging of the filter used in the greywater recycling system is prevented by using a self-clearing filter of this invention. The self-clearing filter advantageously requires virtually no maintenance. The self-clearing filter does not allow the solid waste that is removed from the greywater to be stored within the sealable tank. The solid waste that is removed from the greywater can exit directly to the sanitary drain from the self-clearing filter without coming in contact with any of the components of the recycling system other than the influx line. The self-clearing filter advantageously does not interrupt the operative flow of grey water to clear the filter.

Included within this disclosure are methods for recycling grey water using an apparatus as described herein. In some aspects, this disclosure represents micro grey water reclamation and use which may reduce any risk associated with pathogens in recycling.

In some variations of this invention, a significant use for reclaimed grey water is contemplated for external subsurface irrigation for landscaping and other ground watering uses. Additionally, the treated grey water may be returned to use in water closets, toilets and other fixtures that flow directly to the sanitary drainage system. Another significant use of a grey water reclamation system is to return grey water to the building to pre-heat water lines for other clean water uses, thereby recovering energy that would otherwise be lost.

Sources of grey water include bathtubs, showers, lavatories, clothes washers and laundry trays. Sources of grey water may also include car washes, and automatic and other laundry facilities. Other sources of grey water include water recreational facilities, swimming pools, jacuzzis, and public showers. Additional sources of grey water include marine sources such as marine craft and cruise ships.

The grey water treated in an apparatus of this invention is suitable for a direct beneficial use or a controlled use that would not otherwise occur.

In certain aspects of this invention, any potential overflow condition in a system or apparatus is appropriately managed because whenever the influx of grey water exceeds the capacity of the system to filter and pump, the influx is automatically discharged directly to a sanitary drainage line.

As used herein, the terms "fluidly connected" and "fluidly attached" refer to a connection between items which brings the items together in fluid communication. For example, a pipe connected to the inlet of a pump normally has the interior that is enclosed by the pipe in fluid communication with the inlet so that fluid can be transported from one item to the other and be contained within the interior.

A water recycling system of this invention may have a sealable tank having a wall, a water influx pipe for delivering water from a source, the influx pipe being fluidly connected at a first end to the source, wherein the influx pipe sealingly engages the wall and passes through the wall on one side of the tank and traverses to, and passes sealingly through the wall on the opposite side of the tank, wherein the influx pipe is fluidly connected at a second end to a one-way valve to an external sanitary drain line, and wherein the influx pipe defines an opening disposed on its gravitationally lower side within the tank, a self-clearing filter disposed within the tank for filtering the water, comprising a filter screen disposed to span the opening of the influx pipe, and a nozzle.

In some embodiments, a water recycling system may include a collector disposed under the filter screen, and optionally a UV tube carrier enclosing a UV tube for irradiating the water, wherein the collector directs the water into the UV tube carrier, a pump for supplying water effluent, an effluent pipe fluidly connected to the pump for directing water effluent out of the tank, wherein the nozzle of the self-clearing filter is fluidly connected to the effluent pipe for spraying the UV-treated water effluent onto the self-clearing filter screen and adapted to force solid waste material off the filter screen and into the influx pipe; and a means for controlling the dose of the water effluent out of the tank such as a float valve.

The opening of the influx pipe can be defined by removing a portion of the wall of the pipe, for example, removing a half-pipe portion of the wall for a certain length. An opening of the influx pipe can be of any length, subject to being disposed completely within the tank. In some embodiments, a half-pipe opening can be from 10-50 cm in length, or from 20-30 cm in length, or about one foot in length. The opening of the influx pipe can also be defined by removing a portion of the wall that is less than half the diameter of the influx pipe, so that the portion removed represents an arc of less than half the circumference of the influx pipe. The opening of the influx pipe can also be defined by removing a portion of the wall that is greater than half the diameter of the influx pipe.

The filter screen can be disposed to span the opening of the influx pipe, and therefore to cover the entire opening of the influx pipe. The filter screen may be substantially larger than the opening so that when attached to the influx pipe, the filter screen will cover the entire opening.

In some variations, a grey water reclamation and recycling system of this invention may have a sealable tank with a sealable top, a wall for holding a quantity of grey water, a grey water influx pipe for delivering grey water from a source, which may be inserted at a gravitationally declining angle through the tank, a one-way or check valve to prevent return of grey water or other fluid from the sanitary drain, a self-clearing filter disposed within the tank, which may be a half-pipe filter and may include a nozzle connected to an effluent pipe, and optionally a collector, UV tube carrier and UV tube for irradiating grey water. A grey water reclamation and recycling system may further have a pump for supplying grey water effluent, an effluent pipe, and means for controlling and adjusting the dose of the grey water effluent out of the system.

In certain variations, the grey water influx pipe will have the inlet and outlet at the same elevation.

In some embodiments, a grey water reclamation and recycling system of this invention has a collector for directing water into the UV tube carrier. The collector can receive the filtered grey water flux from the self-clearing filter and direct it into the UV tube carrier.

The UV tube carrier can be adapted to receive filtered grey water flux from the collector and redirect it in a gravitationally downward spiral path around the UV tube to increase the residence time of the grey water in the irradiation zone of the UV tube. The collector and UV tube carrier can be integrated with each other, and with the sealable tank. The influx pipe, screen, collector and nozzle may be integrated. The UV tube carrier may have an attached plumbing manifold to adapt the UV tube carrier to the collector, or directly to the influx pipe, for gravity flow of the water through the UV tube carrier.

In certain variations, a water recycling system of this invention may have a UV tube carrier, in the absence of a collector, wherein the UV tube carrier is disposed within the influx pipe, or fluidly attached to the influx pipe, or disposed outside the tank and fluidly attached to the influx pipe. Water from the source can be directed through the UV tube carrier before or after passing through the filter.

In some aspects, a grey water reclamation and recycling system may include a means for controlling and adjusting the dose of the water effluent out of the tank. Means for controlling the dose of the water effluent include one or more float switches, a mechanical float switch, a reed and magnet float switch, a pump-down float switch, a tether float switch, a mercury float switch, a horizontal float switch, a vertical float switch, and a multilevel float switch. A float switch suitable for a water recycling system of this disclosure includes those known in the art, for example, an SJE PUMPMASTER pump-down float switch (SJE Rhombus, Detroit Lakes, Minn.). The amount of the dose may be adjusted using one or more float switches.

In certain aspects, a float switch can be used to turn a pump on or off, or to empty the tank, or to actuate a timer for pump operation.

In some variations, the means for controlling the dose of the grey water effluent out of the tank can be manually operated to empty the tank at any desired time. In some embodiments, the pump may be manually operated at any desired time to empty the tank.

A water recycling system of this invention may include a one-way valve between the pump and the effluent pipe for isolating the treated grey water from the influx grey water.

In certain variations, the water recycling system includes a screen in the self-clearing filter. The screen can be any water filtering screen as known in the art, such as a wire mesh screen, a wire mesh blanket, a wire mesh tube, or a perforated screen.

A water recycling system of this disclosure may provide a dose of treated grey water effluent, wherein the dose or volume of the delivered, treated grey water can be any amount, for example, up to about 200 liters, or up to about 1000 liters, or up to about 4000 liters, or more. Larger systems can deliver any dose of grey water. In certain variations, the dose can be less than about 400 liters, or less than about 200 liters, or less than about 100 liters, or less than about 50 liters.

The single delivery capacity or dose of the water recycling system can be adjusted to any amount, for example, up to about 4000 liters or more, or up to about 400 liters, or up to about 200 liters, or up to about 100 liters, or up to about 50 liters.

The water recycling system may optionally include a bypass for diverting the grey water from the source away from the first end of the grey water influx pipe. The bypass can prevent entry of the grey water from the source into the tank. Optionally, the bypass can prevent entry of the grey water into the filter or screen, so that the grey water exits directly to the external sanitary drain. The bypass may also be activated by one or more float switches disposed within the tank.

In some embodiments, a water recycling system will include a separate clean water supply fluidly connected to the source, the tank, or the influx pipe to mix clean water with the grey water. In certain embodiments, clean water is mixed with grey water in the sealable tank to dilute the concentration of chemicals or pathogens in the water.

In other variations, a water recycling system of this disclosure may provide recycling of treated grey water for a laundry facility. In these embodiments, a pump will be selected having a capacity at least as high as the expected maximum influx rate of source water. Optionally, a control unit may be used to add certain volumes of clean water to the source grey water.

This invention also encompasses a self-clearing filter system for a water recycling apparatus. The self-clearing filter of this invention, when used in a water recycling system, provides the advantage of being able to operate the water recycling system without having to supply separate electrical power to clean or maintain the filter. The self-clearing filter of this invention may further provide filtering of the water for extended periods of time without having to interrupt the operation of the water recycling system to clean the filter. In some aspects, the self-clearing filter of this invention advantageously allows efficient operation of a water recycling apparatus with little or no scheduled maintenance.

The self-clearing filter of this invention advantageously does not require that the operative flow be interrupted or discontinued for a period of time to clear the filter. To the contrary, the self-clearing filter of this invention clears the filter during the operative positive or forward flow of the system in which it is installed.

The self-clearing filter system may include a filter for filtering an influx water stream, where the filter has a screen with a lumenous side and an external side. A pump for supplying water that has already been filtered through the filter may be fluidly connected to a nozzle, and a spray from the nozzle may impinge against the external side of the filter screen to force waste material off the lumenous side of the screen to clear the filter. The lumenous side of the screen faces the source water, while the external side faces the filtered water. The nozzle can include a gate valve or other valve to adjust the head pressure of the spray. The screen may be any filter screen known in the art to be suitable for water filtration, such as a wire mesh screen, a wire mesh blanket, a wire mesh tube, and a perforated screen.

In some embodiments, this disclosure provides a kit for water recycling. The kit may include a water recycling apparatus as described herein, combined with a means for connecting the grey water influx pipe to a source of grey water, a means for connecting the effluent pipe to an irrigation system or other water use system, and a means for connecting the one-way valve at the second end of the influx pipe to an external sanitary drain line. Means for connecting pipes and valves include plumbing adapters and connectors as known in the art. In certain aspects, the kit may include a grey water reclamation system as described above, a first adapter for connecting the grey water influx pipe to a source of grey water, a second adapter for connecting the effluent pipe to an irrigation system, and a third adapter for connecting the one-way valve at the second end of the influx pipe to an external sanitary drain line. Adapters include plumbing components for joining standard size and other piping, as are known in the art.

This invention includes methods for recycling residential grey water with the systems and apparatuses discussed above at a residential or industrial site. The methods include connecting the recycling system or apparatus to a source of grey water at the site. The grey water recycling system may be buried near the main sanitary drain of the building, or other suitable location. The grey water recycling system may be installed within the building, or within s sump.

There are many uses for reclaimed grey water. Significant beneficial uses can be found in irrigation. Drip irrigation for landscaping is an example of a significant benefit that can be provided with the grey water systems described herein. Other uses include, any external subsurface irrigation, ground watering, above-ground irrigation, and recycling of treated effluent to the internal residential or industrial setting for use in sanitary-only fixtures.

A significant use for grey water is to save energy by preheating clean water in the plumbing of a building.

Another use for grey water is to save water and energy by recycling water used in laundry and other cleaning operations.

This disclosure provides systems, apparatuses, and methods for saving energy using reclaimed grey water. In some embodiments, grey water is reclaimed from a source and contacted with the clean water plumbing of the building, thereby saving energy by transferring heat from the reclaimed grey water to clean water within the plumbing of the building. The reclaimed grey water can be contacted with the plumbing in various ways, for example, by holding the reclaimed grey water in a tank through which the clean water plumbing passes, by piping both the grey water and the separate clean water through an energy holding tank containing a fluid to act as a heat sink, by running parallel lines for reclaimed grey water and other clean water, and other methods for transferring energy. In these embodiments, the reclaimed grey water may be filtered before use, optionally with a self-clearing filter as described herein.

In some variations, the grey water can be reclaimed outside the building, and returned to the building for contacting with the clean water plumbing of the building. The returned grey water can be contacted with the plumbing in various ways, as discussed above, to save energy.

Referring to FIG. 1, in some embodiments, a water recycling apparatus of this invention will have a sealable tank (10) with a sealable top (15) and having a wall (12) for holding a quantity of grey water (14). The sealable tank (10) may be made from any material, including glass fiber, aramid, carbon fiber, composites, plastics, thermoplastic, polyethylene, PVC, fiber reinforced plastic, polymers, metals, aluminum, steel, and galvanized steel. For underground installations, the sealable tank (10) can be made of fiberglass. The tank may have various internal or external linings or coatings.

The sealable tank (10) can be airtight and gastight, and may ventilate through the grey water source line, or may be ventilated at the tank itself, or at any other convenient point on the influx side. The sealable tank (10) can optionally have a service drain at the bottom. Examples of a sealable tank include those known in the art such as a preformed fiberglass tank, or a preformed polymer tank. In certain variations, the sealable tank (10) may optionally include a separate holding tank or u-tube fluidly connected to the influx pipe (20) to remove floating and non-floating solids from the source.

The sealable tank (10) can be provided with a first opening (22) in the wall (12) of the tank, through which a grey water influx pipe (20) can be sealingly inserted. The grey water influx pipe (20) is fluidly connected at a first end (30) to a grey water source. The source may be cut off from the sealable tank (10) during periods of non-operation by closing a cut-off valve (180). The water recycling system may have a bypass valve (175) for diverting the grey water from the source away from the influx pipe (20).

The grey water influx pipe (20) can be inserted through the first opening (22) in the wall (12) on one side of the tank, and traverse to, and sealingly engage and pass through a second opening (24) in the wall (12) at a distal point, or opposite side of the tank, which can optionally be at a lower gravimetric point. The grey water influx pipe (20) is fluidly connected at a second end (60) to a one-way valve (70), which is fluidly connected to an external sanitary drain (75). The grey water influx pipe (20) can sealingly engage and pass through the first opening (22) and the second opening (24) of the sealable tank (10) using, for example, waterproofing material, ABS adhesive, adhesive, caulking, or rubber grommets. The grey water influx pipe (20) can optionally be integrated with the first opening (22) and the second opening (24), for example, by casting the grey water influx pipe (20) with the sealable tank (10).

The influx pipe (20) can be made from two or more sections which may be connected with a flexible coupling (26). Examples of a flexible coupling include rubber grommets, rubber bands or sleeves, and other flexible couplings for plumbing as are known in the art.

A section of the influx pipe (20) can include components of a self-clearing filter (80). The self-clearing filter (80) may include a screen (85), as well as a nozzle (160) for creating a spray of water effluent which impinges on the external side of the screen (85) of the half-pipe filter with sufficient force to remove waste material that may collect on the side of the screen inside the influx pipe (20).

In some variations, the influx pipe (20) is integrated with the top of the sealable tank (10). The influx pipe (20) may optionally be disposed outside the sealable tank (10), having the self-clearing filter (80) fluidly connected to the sealable tank (10), or the sealable top (15) of the sealable tank (10). In certain variations, the influx pipe (20) may be integrated with the sealable top (15) of the sealable tank (10).

The grey water influx pipe (20) includes, at a point within the tank, components of a self-clearing filter (80). The self-clearing filter (80) has an opening located on the underside of a section of the influx pipe (20) which may be covered with a screen (85) or other filter material. The self-clearing filter (80) can include a half-pipe shape arrangement. Grey water influx from the source passes through the self-clearing filter (80) and the screen (85) into the sealable tank (10) below. Whenever the influx of grey water from the source exceeds the capacity of the self-clearing filter (80) to deliver filtered grey water to the tank, the excess influx is automatically received and discharged as overflow directly to a sanitary drain through the second end (60). Influx and flow of grey water across the screen may also assist in clearing the screen.

A significant feature of the self-clearing filter (80) and influx pipe (20) arrangement in operation is that source grey water which does not pass through the screen (85) must exit to the sanitary drain at the second end (60) of the grey water influx pipe (20).

In some variations, a UV tube for disinfecting water can be mounted on the wall (12) and disposed within the sealable tank (10), or can be disposed outside the sealable tank (10) and fluidly connected to the influx pipe (20) to flow the unfiltered water through the UV tube, or fluidly connected to the sealable tank (10) to flow the filtered water through the UV tube.

Filtered grey water that has passed through the screen (85) fills the tank to a certain level. The level of water in the tank may be controlled with a means for controlling the dose of the grey water effluent out of the tank. Means for controlling the dose include a float switch (118), as well as additional float switches and other switch means described above. The float switch (118) can activate a pump (120) for supplying the filtered grey water effluent to an effluent pipe (140) at a certain head pressure. The effluent pipe (140) is fluidly connected to the pump for directing filtered grey water effluent out of the tank to an outlet (144) from the sealable tank (10).

The pump (120) may provide flux of about 40 liters per minute at about 2500 cm total dynamic head (TDH), which is about 10 gallons per minute at 80' (ft) TDH. The pump (120) can be a submersible or non-submersible pump as known in the art for water supply systems, sump systems, irrigation systems, or outdoor water displays. Examples of a pump include FLOTEC thermoplastic submersible pumps (Flotec, Delavan, Wis.). The pump (120) can be mounted at the bottom of the sealable tank (10), if submersible, or at any elevation within the tank.

The pump (120) may also be located outside the sealable tank (10) and be fluidly connected to the filtered water in the tank and to the effluent pipe (140) and nozzle (160) with appropriate plumbing In certain aspects, the pump (120) is an on-demand pump which can be activated by a float switch (118), or by a switch outside the tank which responds to the need for reclaimed water in an external system such as an irrigation system or water recycling system. In some variations, the pump (120) is an on-demand pump which may be controlled by a combination of conditions from one or more float switches (118) at different locations, and/or an external switch. An on-demand pump may also be used to manually activate a self-clearing filter, and to manually activate dosing of the stored, filtered water, or to manually pump out all of the water from the tank.

Appropriate electrical supply (190) and wiring for the pump, optional UV tube, and float switches, if necessary, can be provided through the wall or top of the sealable tank according to methods known in the art.

Grey water effluent can be supplied from the effluent pipe (140) to an outlet (144) from the sealable tank (10), and thereafter to an external subsurface irrigation system, among other uses, or to a building for use in a water closet or toilet, as well as to a building to pre-heat water lines for other clean water uses, thereby recovering energy that would otherwise be lost. Examples of an external irrigation system include GEOFLOW subsurface drip systems (Geoflow, Corte Madera, Calif.). Grey water effluent can also be supplied to a further treatment series designed to provide potable water.

In some embodiments, a water recycling apparatus of this invention can supply water to a headworks for an outdoor subsurface irrigation system. Effluent from the effluent pipe (140) and outlet (144) from the sealable tank (10) can enter the irrigation bed.

Figure 2:
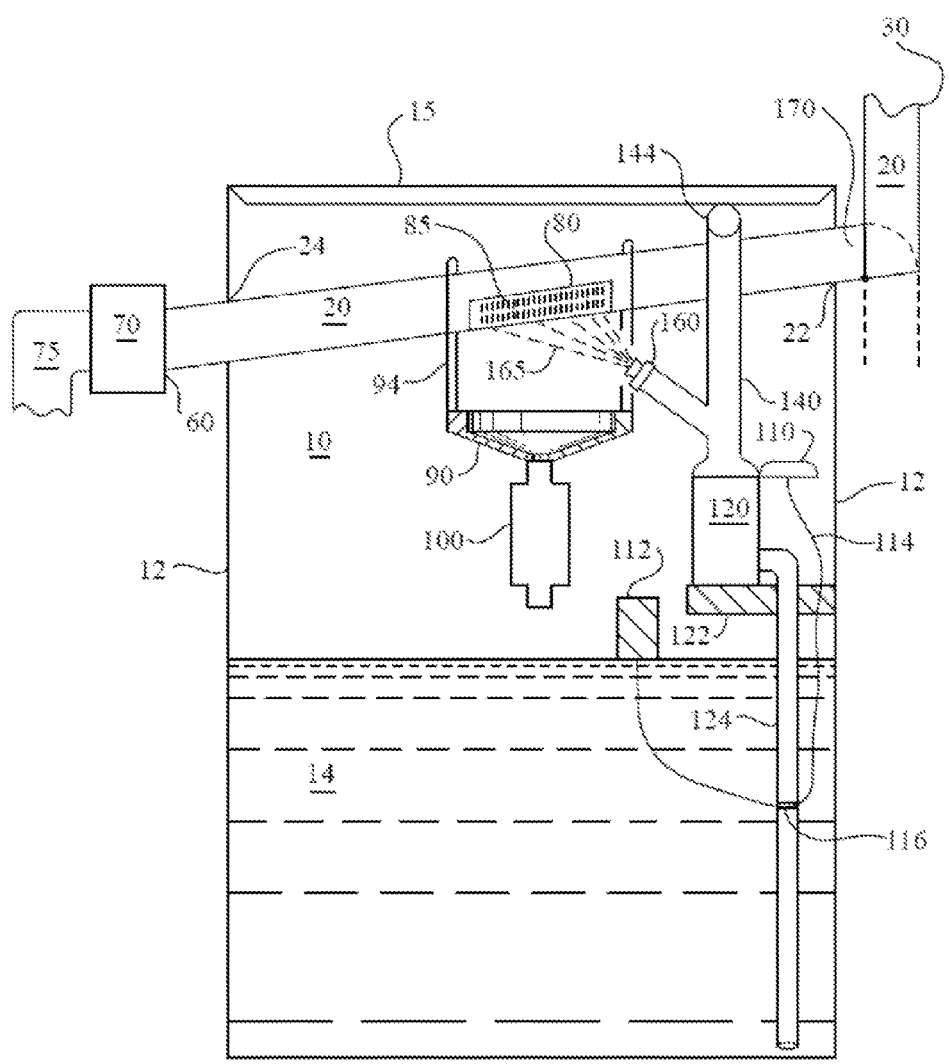
FIG. 2: Schematic representation of an embodiment of this invention in which water to be recycled is reclaimed from a source through an influx pipe into a sealable tank. The water is filtered with a self-clearing filter, treated with ultraviolet irradiation, and dosed with a pump to an external system.

Referring to FIG. 2, in some embodiments a water recycling apparatus of this invention will have a sealable tank (10) with a sealable top (15), and a wall (12) for holding a quantity of UV-treated grey water (14).

In some variations, it may be desirable to empty the sealable tank (10) on-demand. The water recycling system may have a bypass for diverting the grey water from the source away from the first end of the grey water influx pipe and preventing entry of the grey water from the source into the tank. The bypass can be a mechanical flap (170) which may divert influx before the first opening (22) of the grey water influx pipe (20), or may optionally close off the influx pipe (20) from the source. The bypass can also be a mechanical slide which covers the half-pipe filter and diverts influx to the second end (60) of the grey water influx pipe (20).

The grey water influx pipe (20) can be inserted at a gravitationally declining angle through the first opening (22) in the wall (12) on one side of the tank, and traverse to, and sealingly engage and pass through a second opening (24) in the wall (12) on the opposite side of the tank, which can optionally be at a lower gravimetric point. The grey water influx pipe (20) is fluidly connected at a second end (60) to a one-way valve (70), which is fluidly connected to an external sanitary drain (75). The grey water influx pipe (20) can sealingly engage and pass through the first opening (22) and the second opening (24) of the sealable tank (10).

The grey water influx pipe (20) includes, at a point within the tank, components of a self-clearing filter (80). The self-clearing filter (80) has an opening located on the underside of the influx pipe which may be covered with a screen (85) or other filter material. The self-clearing filter (80) can be a half-pipe shape arrangement. Grey water influx from the source passes through the self-clearing filter (80) and the screen (85) into the tank below.

The grey water influx that passes through the self-clearing filter (80) may be directed by a collector (90) into a UV tube carrier (100). The UV tube carrier is a holder for an ultraviolet tube that can be used to irradiate the grey water with ultraviolet radiation. The ultraviolet radiation can reduce the level of pathogens and at least partly disinfect the grey water. Examples of a UV tube carrier include a SANITRON ultraviolet water purifier (Atlantic Ultraviolet Corporation, Hauppauge, N.Y.) and the SALCOR ultraviolet disinfection unit (Salcor Engineering, Seattle, Wash.). Additional plumbing manifold may be provided to attach the UV tube carrier (100) to the collector (90) or influx pipe (20). The UV tube may be a mercury vapor lamp or germicidal lamp. The filtered grey water influx may be directed by the collector (90) into the UV tube carrier (100) for a gravity flow system. The collector (90) can be attached by one or more hangars (94) to the influx pipe (20). In certain variations, an additional pump can be provided to flow the filtered grey water through the UV tube carrier (100). In some embodiments, the UV tube carrier (100) can direct the filtered grey water flux in a gravitationally downward spiral path around the UV tube. The UV tube carrier (100), ultraviolet tube, and collector (90) can be integrated with each other, and can be integrated with the sealable tank (10) or grey water influx pipe (20). Optionally, the UV tube carrier (100) can be mounted on the wall (12) and disposed within the sealable tank (10), or can be disposed outside the sealable tank (10) and fluidly connected to the influx pipe (20) to flow the unfiltered water through the UV tube carrier (100), or fluidly connected to the sealable tank (10) to flow the filtered water through the UV tube carrier (100).

The filtered, UV-treated grey water can exit the UV tube carrier (100) and fill the tank to a level which can be controlled with a means for controlling the dose of the UV-treated grey water effluent out of the tank. Means for controlling the dose include a float operated switch (110), as well as additional float switches and other switches and switch means described above. The float operated switch (110) may include a tethered float (112), float connector line (114), and float tether strap (116). The float operated switch (110) activates a pump (120) for supplying the UV-treated grey water effluent to an effluent pipe (140) which is fluidly connected to the pump for directing UV-treated grey water effluent out of the tank.

The pump (120) may also be disposed outside the sealable tank and be fluidly connected to the filtered water in the tank and to the effluent pipe (140) and nozzle (160) with appropriate plumbing In certain aspects, the pump (120) is an on-demand pump which can be activated by a float operated switch (110), or by a switch outside the tank which responds to the need for reclaimed water in an external system such as an irrigation system or water recycling system. In some variations, the pump (120) is an on-demand pump which is controlled by a combination of conditions from a float operated switch (110) and an external switch. An on-demand pump may also be used to manually activate a self-clearing filter, and to manually activate dosing of the stored, filtered water, or to manually pump out all of the water from the tank.

Grey water effluent can be supplied from the effluent pipe (140) to an outlet (144) from the sealable tank (10), and thereafter to an external subsurface irrigation system, or to a building for use in a water closet or toilet, as well as to a building to pre-heat water lines for other clean water uses, thereby recovering energy that would otherwise be lost.

In some variations, a water recycling apparatus of this invention will have openings in the sealable tank (10), the grey water influx pipe (20), or the effluent pipe (140) through which chemical treatments can be introduced. Optionally, the water recycling apparatus may include a pump to remove grey water influx or effluent through such openings to apply additional purification or disinfectant treatments, such as chlorination, antibacterials, filtration, separation, aeration, or ozonation.

In certain embodiments, a water recycling apparatus of this invention will have a timer connected to the pump or float switch to activate emptying of the tank after a period of time, for example, after about 72 hours.

In some embodiments, a water recycling apparatus of this invention may have a timer connected to the pump or float switch to activate emptying of the tank for a period of time, for example, pumping for 30 seconds to one minute, or a few minutes to supply a dose of water from the tank.

Embodiments of this invention include a grey water recycling system for providing a filtered grey water effluent comprising a sealable tank, an influx pipe, a self-clearing filter disposed within the tank comprising a filter screen and a nozzle, a pump, and an effluent pipe, wherein the nozzle provides a spray of filtered water effluent that contacts the filter screen and is adapted to force waste material off the filter screen into the influx pipe.

Embodiments of this invention include a water recycling system for providing a dose of a filtered water effluent, comprising:

a sealable tank having a wall;

a water influx pipe for delivering water from a source to the tank, the influx pipe being fluidly connected at a first end to the source, wherein the influx pipe engages the wall sealingly and passes through the wall on one side of the tank and traverses to, and passes sealingly through the wall on the opposite side of the tank, wherein the influx pipe is fluidly connected at a second end to a one-way valve to an external sanitary drain line, and wherein the influx pipe defines an opening disposed on its gravitationally lower side within the tank;

a self-clearing filter disposed within the tank for filtering the water from the source to remove waste material, the self-clearing filter comprising a filter screen disposed to span the opening of the influx pipe, and a nozzle, wherein the water from the source passes through the filter screen and is stored as filtered water in the tank;

a pump having an inlet in fluid communication with the filtered water, wherein the pump supplies a filtered water effluent;

an effluent pipe fluidly connected to the pump for directing the filtered water effluent out of the tank, wherein the nozzle of the self-clearing filter is fluidly connected to the effluent pipe and provides a spray of filtered water effluent, and wherein the spray contacts the self-clearing filter screen and is adapted to force waste material off the filter screen and into the influx pipe; and a means for controlling the dose of the filtered water effluent out of the tank.

Embodiments of this invention include a water recycling system, further comprising a UV tube carrier enclosing a UV tube for irradiating the source water or filtered water.

Embodiments of this invention include a water recycling system, further comprising a collector disposed under the filter screen for directing the filtered water into the UV tube carrier.

Embodiments of this invention include a water recycling system, wherein the water from the source is grey water.

Embodiments of this invention include a water recycling system, wherein the UV tube carrier directs the filtered water flux in a gravitationally downward spiral path around a UV tube.

Embodiments of this invention include a water recycling system, wherein the influx pipe, screen, and nozzle are integrated.

Embodiments of this invention include a water recycling system, wherein the nozzle is pivotably mounted or affixed. A pivotably mounted nozzle can be manually adjusted to various fixed positions, or may be pivoted by water flow or water pressure during operation to spray water effluent onto the self-clearing filter screen at different angles.

Embodiments of this invention include a water recycling system, wherein the nozzle provides a spray of water effluent that wobbles in direction across the filter screen. In some embodiments, the spray across the filter screen may wobble, pulsate, rotate, or otherwise impinge on the screen in a pattern such as a circle, oval or closed-loop pattern.

Embodiments of this invention include a water recycling system, wherein the means for controlling the dose of the UV-treated water effluent out of the tank is one or more float switches.

Embodiments of this invention include a water recycling system, wherein the pump can be manually operated to empty the tank.

Embodiments of this invention include a water recycling system, further comprising a one-way valve between the pump and the effluent pipe.

Embodiments of this invention include a water recycling system, wherein the filter screen is a half-pipe filter screen.

Embodiments of this invention include a water recycling system, wherein the filter screen is selected from the group of a wire mesh screen, a wire mesh blanket, a wire mesh tube, and a perforated screen.

Embodiments of this invention include a water recycling system, wherein the dose is less than about 200 liters.

Embodiments of this invention include a water recycling system, wherein the dose is less than about 4000 liters.

Embodiments of this invention include a water recycling system, further comprising a bypass for diverting the water from the source away from the first end of the influx pipe and preventing entry of the water from the source into the tank.

Embodiments of this invention include a grey water recycling system comprising:

a sealable tank having a wall for holding a quantity of grey water;

a grey water influx pipe for delivering water from a source, the influx pipe being fluidly connected at a first end to the source, wherein the influx pipe engages the wall sealingly and passes through the wall on one side of the tank and traverses to, and passes sealingly through the wall on the opposite side of the tank, wherein the influx pipe is fluidly connected at a second end to a one-way valve to an external sanitary drain line, and wherein the influx pipe defines an opening disposed on its gravitationally lower side within the tank;

a self-clearing filter disposed within the tank for filtering the grey water, comprising a filter screen disposed to span the opening of the influx pipe, and a nozzle;

a collector disposed under the filter screen;

a UV tube carrier enclosing a UV tube for irradiating the grey water, wherein the collector directs the water into the UV tube carrier;

a pump for supplying a UV-treated grey water effluent;

a grey effluent pipe fluidly connected to the pump for directing UV-treated grey water effluent out of the tank, wherein the nozzle of the self-clearing filter is fluidly connected to the effluent pipe for spraying the UV-treated grey water effluent onto the self-clearing filter screen and adapted to force solid waste material off the filter screen and into the influx pipe; and a float switch.

Embodiments of this invention include a self-clearing filter system for a water recycling apparatus comprising a filter for filtering an influx source water, the filter comprising a screen having a lumenous side and an external side, a pump for supplying the filtered influx source water to a nozzle, wherein the nozzle is fluidly connected to the pump for receiving the filtered influx source water from the pump, and wherein under pressure from the pump the filtered influx source water exits the nozzle in a spray impinging against the external side of the filter screen to force waste material off the lumenous side of the screen to clear the filter.

In certain embodiments, the nozzle can be pivotably mounted to spray at different angles toward the filter screen.

Embodiments of this invention include a self-clearing filter system, wherein the screen is selected from the group of a wire mesh screen, a wire mesh blanket, a wire mesh tube, and a perforated screen.

Embodiments of this invention include a kit for water recycling comprising a water recycling system described above, means for connecting the grey water influx pipe to a source of grey water, means for connecting the effluent pipe to an irrigation system, and means for connecting the one-way valve at the second end of the influx pipe to an external sanitary drain line.

Embodiments of this invention include a kit for water recycling comprising a water recycling system described above, a first adapter for connecting the water influx pipe to a source of water, a second adapter for connecting the effluent pipe to an irrigation system, and a third adapter for connecting the one-way valve at the second end of the influx pipe to an external sanitary drain line.

Embodiments of this invention include a method for recycling grey water at a residential site comprising providing an apparatus described above at the residential site and connecting the apparatus to a source of grey water.

Embodiments of this invention include a method for recycling grey water at an industrial site comprising providing an apparatus described above at the industrial site and connecting the apparatus to a source of grey water.

Embodiments of this invention include a method for reclaiming grey water for a landscape drip irrigation system comprising providing an apparatus described above, connecting the apparatus to a source of grey water, and dosing the UV-treated water effluent to the drip irrigation system.

Embodiments of this invention include a method for preheating clean water in the plumbing of a building to save energy comprising reclaiming grey water outside the building, returning the reclaimed grey water to the building, and contacting the returned grey water with the clean water plumbing of the building, thereby transferring heat from the returned grey water to clean water within the plumbing of the building.

Embodiments of this invention include a method for preheating clean water in the plumbing of a building to save energy, further comprising reclaiming at least a portion of the grey water inside the building.

Embodiments of this invention include a method for preheating clean water in the plumbing of a building to save energy, further comprising filtering the reclaimed grey water.

Embodiments of this invention include a method for preheating clean water in the plumbing of a building to save energy, wherein the grey water is filtered with a self-clearing filter.

Embodiments of this invention include a method for recycling grey water in a laundry facility comprising providing an apparatus described above, connecting the apparatus to a source of grey water from the laundry facility, and recycling the grey water from the source to a clean water line of the laundry facility.

Embodiments of this invention include a method for recycling grey water in a car wash facility comprising providing an apparatus described above, connecting the apparatus to a source of grey water from the car wash facility, and recycling the grey water from the source to a clean water line of the car wash facility.

The examples given herein, and the exemplary language used herein are solely for the purpose of illustration, and are not intended to limit the scope of the invention.

While this invention has been described in relation to certain embodiments, and many details have been set forth for purposes of illustration, it will be apparent to those skilled in the art that this invention includes additional embodiments, and that some of the details described herein may be varied considerably without departing from this invention. This invention includes such additional embodiments, modifications and equivalents. In particular, this invention includes any combination of the features, terms, or elements of the various illustrative components and examples.

The use herein of the terms "a," "an," "the" and similar terms in describing the invention, and in the claims, are to be construed to include both the singular and the plural.

The terms "comprising," "having," "including" and "containing" are to be construed as open-ended terms which mean, for example, "including, but not limited to."

Thus, terms such as "comprising," "having," "including" and "containing" are to be construed as being inclusive, not exclusive.

Recitation of a range of values herein refers individually to each and any separate value falling within the range as if it were individually recited herein, whether or not some of the values within the range are expressly recited. For example, the range "4 to 12" includes without limitation any whole, integer, fractional, or rational value greater than or equal to 4 and less than or equal to 12, as would be understood by those skilled in the art. Specific values employed herein will be understood as exemplary and not to limit the scope of the invention.

Definitions of technical terms provided herein should be construed to include without recitation those meanings associated with these terms known to those skilled in the art, and are not intended to limit the scope of the invention.

What is claimed is:

1. A water recycling system for providing a filtered water effluent, comprising:
   a sealable tank having a wall;
   a water influx pipe for delivering water from a source to the tank, the influx pipe being fluidly connected at a first end to the source, wherein the influx pipe engages the wall sealingly and passes through the wall on one side of the tank and traverses to, and passes sealingly through the wall at a distal point, wherein the influx pipe is fluidly connected at a second end through a one-way valve to an external sanitary drain line, and wherein the influx pipe defines an opening disposed on its gravitationally lower side within the tank;
   a self-clearing filter disposed within the tank for filtering the water from the source, the self-clearing filter comprising a filter screen disposed to span the opening of the influx pipe, and further comprising a nozzle constructed and arranged to direct a spray of water at said filter screen, wherein the water from the source passes through the filter screen and is stored as filtered water in the tank;
   a pump having an inlet in fluid communication with the filtered water and through which the filtered water can be drawn, wherein the pump supplies a filtered water effluent; and
   an effluent pipe fluidly connected to the pump for directing the filtered water effluent out of the tank, wherein the nozzle of the self-clearing filter is fluidly connected to the effluent pipe and provides a spray of filtered water effluent, wherein the spray contacts the self-clearing filter screen forcing waste material off the filter screen into the influx pipe.

2. The water recycling system of claim 1, wherein the water from the source is grey water.

3. The water recycling system of claim 1, further comprising one or more float switches for controlling the dose of the filtered water effluent out of the tank.

4. The water recycling system of claim 1, further comprising a UV tube for irradiating the source water or filtered water.

5. The water recycling system of claim 1, wherein the spray wobbles in direction across the filter screen, or impinges on the screen in a pattern.

6. The water recycling system of claim 1, wherein the pump can be manually operated to empty the tank.

7. The water recycling system of claim 1, further comprising a one-way valve between the pump and the effluent pipe.

8. The water recycling system of claim 1, wherein the filter screen is selected from a wire mesh screen, a wire mesh blanket, a wire mesh tube, and a perforated screen.

9. The water recycling system of claim 1, wherein the pump is located outside the tank.

10. The water recycling system of claim 1, further comprising a bypass for diverting the water from the source away from the first end of the influx pipe and preventing entry of the water from the source into the tank.

* * * * *